US012781796B2

(12) United States Patent
Jungmayr et al.

(10) Patent No.: US 12,781,796 B2
(45) Date of Patent: Nov. 3, 2026

(54) COMBINED AXIAL/RADIAL MAGNETIC BEARING

(71) Applicant: LINZ CENTER OF MECHATRONICS GMBH, Linz (AT)

(72) Inventors: Gerald Jungmayr, Linz (AT); Robert Santner, Linz (AT)

(73) Assignee: Linz Center of Mechatronics GmbH, Linz (AT)

( * ) Notice: Subject to any disclaimer, the term of this patent is extended or adjusted under 35 U.S.C. 154(b) by 296 days.

(21) Appl. No.: 18/282,947

(22) PCT Filed: Mar. 29, 2022

(86) PCT No.: PCT/EP2022/058235
§ 371 (c)(1),
(2) Date: Mar. 7, 2024

(87) PCT Pub. No.: WO2022/207625
PCT Pub. Date: Oct. 6, 2022

(65) Prior Publication Data
US 2024/0200597 A1 Jun. 20, 2024

(30) Foreign Application Priority Data
Mar. 29, 2021 (DE) ......................... 102021107842.3

(51) Int. Cl.
*F16C 32/04* (2006.01)

(52) U.S. Cl.
CPC ...... *F16C 32/0485* (2013.01); *F16C 32/0465* (2013.01); *F16C 32/0446* (2013.01)

(58) Field of Classification Search
CPC .............. F16C 32/0485; F16C 32/0465; F16C 32/0446; F16C 2380/26; F16C 32/047
(Continued)

(56) References Cited

U.S. PATENT DOCUMENTS

| | | | | |
|---|---|---|---|---|
| 5,514,924 A * | 5/1996 | McMullen | F16C 32/0485 310/90.5 |
| 5,525,848 A * | 6/1996 | Pinkerton | H02K 7/1807 310/90 |

(Continued)

FOREIGN PATENT DOCUMENTS

| | | |
|---|---|---|
| CN | 108506343 A | 9/2018 |
| DE | 69502925 T2 | 7/1998 |

(Continued)

*Primary Examiner* — Ahmed Elnakib
(74) *Attorney, Agent, or Firm* — Murphy, Bilak & Homiller PLLC

(57) ABSTRACT

A device for supporting a shaft includes: a permanent magnet connected to the shaft: a stator having first and second yokes made of a soft-magnetic material: a first actuator coil on the first yoke; and two or more second actuator coils on the second yoke. The first yoke has an opening into which the shaft is inserted so that an axial air gap is formed between the first yoke and an end face of the shaft, or an element connected thereto. A radial air gap is formed between the first yoke and a circumferential surface of the shaft. A further radial air gap is formed between the circumferential surface of the shaft and the second yoke. The permanent magnet is positioned relative to the first and second yokes such that the permanent magnet generates a magnetic bias flux in both the axial air gap and the further radial air gap.

16 Claims, 5 Drawing Sheets

(58) Field of Classification Search
USPC .......................................................... 310/90.5
See application file for complete search history.

(56) References Cited

U.S. PATENT DOCUMENTS

| | | | | |
|---|---|---|---|---|
| 11,028,877 | B2 * | 6/2021 | Tangudu | H02K 7/09 |
| 2004/0150278 | A1 * | 8/2004 | Okada | F16C 32/048 310/90.5 |
| 2010/0231076 | A1 * | 9/2010 | Chiba | H02K 7/09 310/90.5 |
| 2011/0163622 | A1 * | 7/2011 | Filatov | H02K 7/09 310/90.5 |
| 2012/0299422 | A1 * | 11/2012 | Filatov | H02K 7/09 310/90.5 |
| 2017/0298985 | A1 * | 10/2017 | Brakensiek | D01H 4/12 |
| 2024/0200597 | A1 * | 6/2024 | Jungmayr | F16C 32/0465 |

FOREIGN PATENT DOCUMENTS

| | | | |
|---|---|---|---|
| DE | 102005030724 | A1 | 1/2007 |
| JP | 2011-085223 | * | 4/2011 |
| WO | 2020183884 | A1 | 9/2020 |

* cited by examiner

COMBINED AXIAL/RADIAL MAGNETIC BEARING

TECHNICAL FIELD

The present disclosure relates to the field of magnetic bearing technology, and more particularly to a combined axial/radial magnetic bearing which can support both axial and radial bearing forces.

BACKGROUND

Magnetic bearings allow a shaft to be supported without material contact by means of magnetic forces. The bearing force is usually generated by controlled electromagnets. The stability of the electromechanical system is ensured by suitable feedback and electronic control. A combination of electromagnets and permanent magnets is also often used in magnetic bearings.

Magnetic bearings can be either axial bearings or radial bearings. It is often necessary to combine both types of bearings in a machine in order to be able to support bearing forces both in the axial direction and in the radial direction (with respect to the axis of rotation of the supported shaft). Typically, a machine (e.g., an electric motor or magnetic gearbox) requires two (or more) radial bearings and at least one axial bearing to hold the shaft in the desired position.

An object of the present disclosure can be considered to be the improvement of known concepts for supporting a shaft by means of magnetic bearing technology.

SUMMARY

The present description describes a device for supporting a shaft. According to an example, the device comprises at least one permanent magnet which is connected to the shaft (and consequently can co-rotate with it), and a stator having a first and second yoke, both of which are composed of a soft-magnetic material. The first yoke has an opening into which the shaft is inserted so that an axial air gap is formed between the first yoke and an end face of the shaft, or an element connected thereto. At the same time, the first yoke is shaped such that a first radial air gap is formed between the first yoke and a circumferential surface of the shaft. The second yoke is arranged in such a way that a second radial air gap is formed between the circumferential surface of the shaft and the second yoke. The device further comprises a first actuator coil which is arranged on the first yoke and two or more second actuator coils which are arranged on the second yoke. The permanent magnet is positioned relative to the first and second yoke such that it generates a magnetic bias flux in both the axial air gap and the second radial air gap.

By positioning the permanent magnet on the rotor, an axial force can be generated in both directions even though the rotor and stator have no undercut.

BRIEF DESCRIPTION OF THE DRAWINGS

Various exemplary embodiments are explained in more detail below with reference to the examples shown in the figures. The illustrations are not necessarily to scale and the disclosure is not limited to the aspects illustrated. Rather, emphasis is placed on illustrating the principles underlying the illustrated embodiments.

DETAILED DESCRIPTION

A magnetic bearing according to the embodiments described herein can support a rotor (e.g. of an electric motor) without contact by generating bearing forces (electromagnetic forces) in radial direction as well as in axial direction. Together with another non-contact bearing, it is thus possible to support the rotor completely without contact. Such a combination of axial bearing and radial bearing is also referred to as a combination bearing (combined axial/radial bearing). The axial direction is determined by the position of the axis of rotation of the rotor and is defined in this description as the z-direction. Together with the x-direction and y-direction, this forms a Cartesian coordinate system. Consequently, a radial bearing force is located in the xy-plane.

Figure 1:
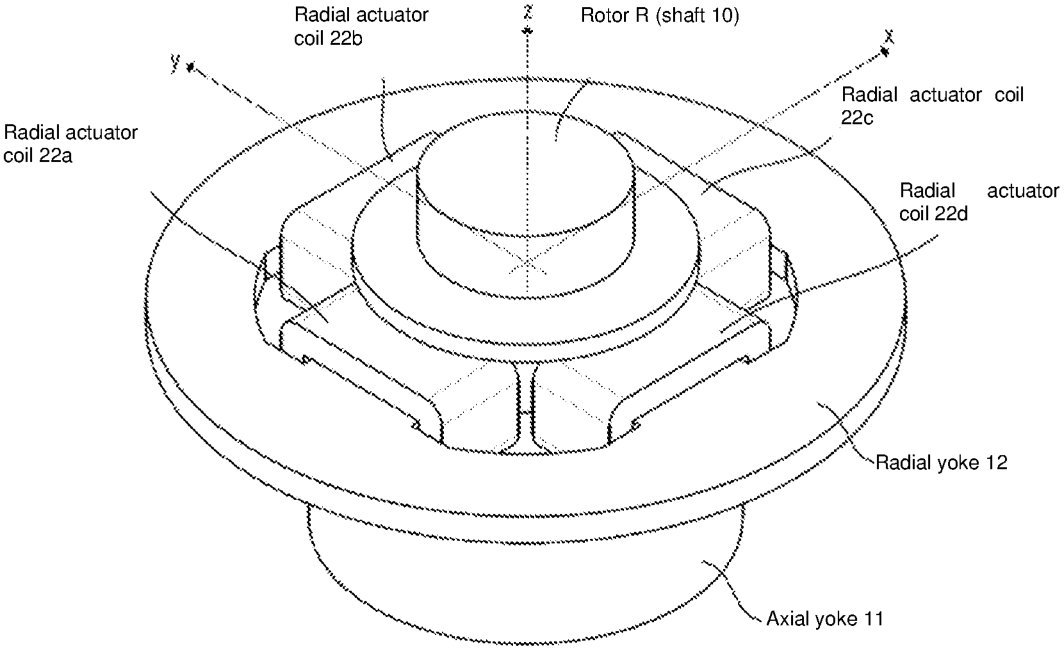
FIGS. 1 and 2 illustrate a perspective view of an example of a combined bearing and an associated cross-sectional view.
Figure 2:
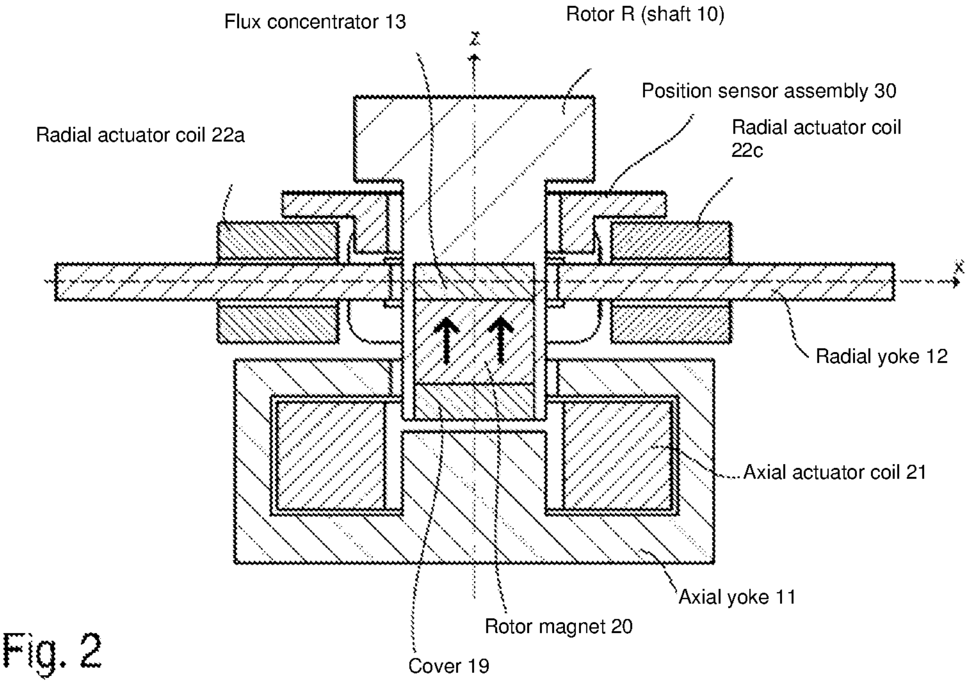

A first embodiment of a combination bearing is shown in FIGS. 1 and 2, wherein FIG. 1 is a perspective view and FIG. 2 is an associated cross-section through the xz plane. The device shown in FIGS. 1 and 2 comprises a stator and a rotor R with a shaft 10. The stator can be arranged in a housing (e.g. of an electromotor) or be part of the housing. The shaft 10 may be, for example, the motor shaft of an electric motor. The stator includes all non-rotating parts that serve to generate and guide the magnetic flux. Similarly, the rotor R comprises the rotating shaft 10 as such and those associated parts which serve to generate and guide the magnetic flux and which co-rotate with the shaft 10.

The device forming the combined bearing comprises at least one permanent magnet 20 mounted in or on the shaft 10 and co-rotating therewith. The permanent magnet 20 is therefore also referred to as a rotor magnet. In the example shown in FIG. 2, the permanent magnet 20 is arranged in a central opening (e.g. coaxial to the axis of rotation) at the shaft end of the shaft 10. The shaft 10 itself is preferably (but not necessarily) made of non-ferromagnetic material, such as stainless steel, plastic, or other material with low magnetic conductivity. In some applications, the shaft 10 may be designed as a hollow shaft. The rotor magnet 20 may be magnetized in the axial direction. In FIG. 2, the magnetization of the rotor magnet 20 is symbolized by arrows.

Figure 6:
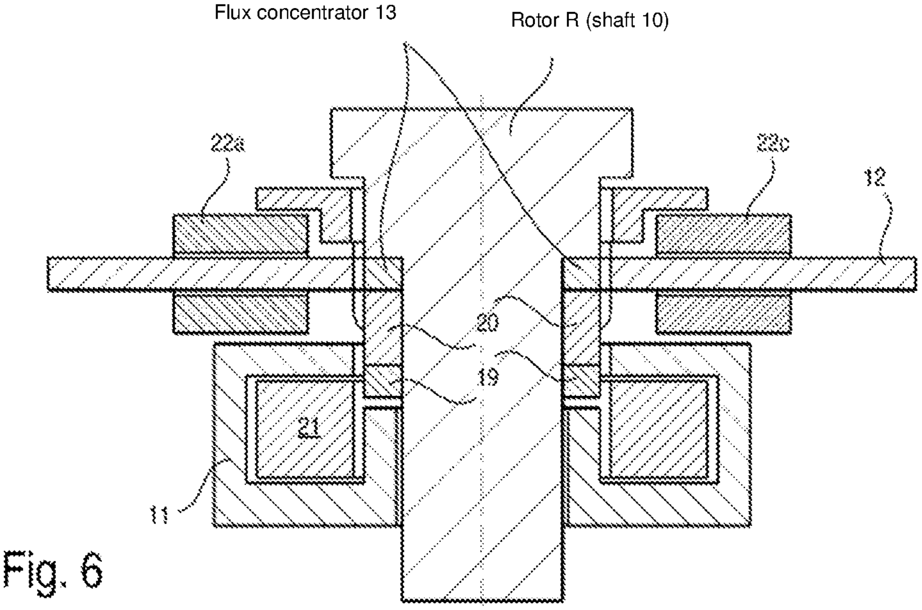
FIG. 6 shows a cross-sectional view of another exemplary embodiment.

According to FIG. 2, the rotor magnet 20 is arranged at the shaft end. In other exemplary embodiments, the rotor magnet 20 can also be arranged at any axial position (z-coordinate) of the shaft 10 (see also FIG. 6). In the example shown in FIG. 2, a flux concentrator 13 (also called flux guide element) is arranged (in axial direction) next to the rotor magnet 20. The flux concentrator 13 is made of soft magnetic material and serves to guide the magnetic flux, which is (locally) essentially confined to the flux concentrator 13. Optionally, the central opening (bore) at the shaft end can be closed by a cover 19, which can also be made of soft magnetic material. The cover 19 may also function as a flux guide element.

The stator comprises two soft magnetic (machine) elements. One of these soft magnetic elements is also referred to hereinafter as the radial yoke 12 (because it conducts magnetic flux in a radial direction). The radial yoke 12 may be a substantially disk-shaped element that extends in the radial direction (i.e., in or parallel to the xy plane). The axial position (i.e., z-coordinate) of the radial yoke 12 roughly corresponds to the axial position of the flux concentrator 13 or the axial position of an end of the rotor agent 20. In some embodiments, the flux concentrator 13 may be omitted, but this may result in a higher magnetic flux leakage. In FIG. 2, the radial yoke 12 is adjacent to the rotor magnet 20 with respect to the z-direction (slightly above the rotor magnet in the drawing). In general, a yoke is part of a magnetic flux circuit, and thus the radial yoke 12 is made of soft magnetic material. Between the flux concentrator 13 and the radial yoke 12 there is a radial air gap $\delta_{R1}$ (see FIG. 3), i.e. the magnetic field lines run essentially in a radial direction through the air gap. The term air gap does not imply, as a rule that there is air in the gap, but merely that there is non-magnetic material in the gap.

The other of the soft magnetic elements is referred to as the axial yoke 11. In the example shown in FIG. 2, this is located (along the z-direction) adjacent to the rotor magnet 20, but on the side opposite the rotor magnet 20 of the radial yoke 12. The axial yoke 11 too serves to guide the flux and can, for example, have a similar shape to a pot magnet. In the illustrated example, the axial yoke 11 has a substantially cylindrical shape, wherein the shaft 10 has one end inserted into this cylindrical shape so that a small axial air gap SA is formed between the end face of the shaft 10 and the axial yoke 11. In the axial air gap SA, the magnetic field lines run essentially in the axial direction between the rotor R and the axial yoke 11. Between the circumference of the shaft and the yoke 11, a further radial air gap $\delta_{R2}$ is formed (see FIG. 3), which allows a magnetic return.

Figure 3:
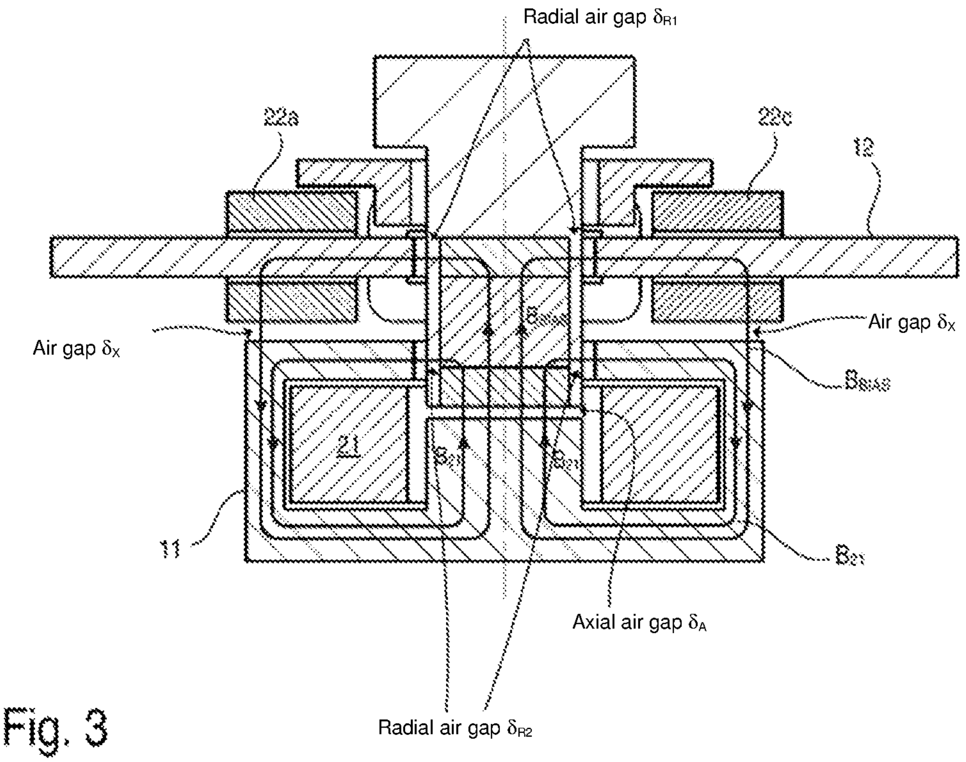
FIG. 3 illustrates the magnetic field lines for the device of FIG. 2.

The rotor magnet 20 generates a magnetic field and a corresponding magnetic flux $B_{BIAS}$ through the axial yoke 11, the radial yoke 12 and the air gaps $\delta_{R1}$, $\delta_A$ and $\delta_X$, wherein in the example shown the air gap x is significantly larger than the other air gaps and can thus result in a certain leakage flux (see FIG. 3). This magnetic flux $B_{BIAS}$ generated by the rotor magnet 20 is also called magnetic bias or bias flux. The course of the magnetic field lines will be discussed in more detail later. In some exemplary embodiments the air gap x between the axial yoke 11 and the radial yoke 12 can also be bridged by ferromagnetic webs.

In order to generate an axial force, the stator of the magnetic bearing has at least one coil 21, which is coaxial with the axis of rotation (z-axis) of the shaft 10, which is also referred to in the following as an "axial actuator coil" (see FIG. 1-4). The axial actuator coil 21 can be mounted inside the pot-shaped axial yoke 11, similar to a pot magnet (electromagnet). More generally, the axial actuator coil 21 is formed by a soft magnetic element which serves as a guide (yoke) for the magnetic flux and which forms an axial air gap SA towards the end face of the shaft 10 and a radial air gap $\delta_{R2}$ towards the circumference of the shaft 10 (see FIG. 3). The magnetic flux (sum flux) $\delta_A$ which acts in the axial air gap is generated by superimposing the bias flux $B_{BIAS}$ generated by the rotor magnet 20 and the magnetic flux $B_{21}$ caused by the axial actuator coil 21. Depending on the current direction in the coil 21, the bias flux $B_{BIAS}$ generated by the rotor magnet 20 is either amplified or attenuated in the axial air gap SA. According to the exemplary embodiments explained herein, it is even possible that the axial force between yoke 11 (part of the stator) and rotor R changes direction, i.e. from attracting (in negative z-direction) to repelling (in positive z-direction) and vice versa.

The device further comprises a sensor device 30 (see FIGS. 1-3) with one or more sensors for measuring the axial and the radial position of the rotor (position sensor(s)), as well as associated control electronics which adjust the currents through the axial actuator coil 21 and the radial actuator coils 22*a-d* depending on the measured position of the rotor. The overall system (stator and rotor as well as control electronics of the magnetic bearing) can thus hold the rotor at a desired axial position. The sensor device and the control electronics will be discussed in more detail later. Sensor devices for measuring the axial and radial position of the rotor are known per se and are therefore not explained further here.

As mentioned, the rotor magnet 20 biases the axial air gap SA with a magnetic flux $B_{BIAS}$, which is why this magnetic flux is also referred to as the bias flux. When no current is flowing through the axial actuator coil 21, an axial force in the negative z-direction usually acts on the rotor R (axial bias force). This force caused by the bias flux $B_{BIAS}$ can be compensated, for example, by energizing the actuator coil 21, causing the actuator coil to generate the magnetic flux denoted as $B_{21}$ (see FIGS. 3 and 4). The flux $B_{21}$ can partially compensate, fully compensate or even overcompensate the bias flux $B_{BIAS}$. In the situation shown in FIG. 4, diagram (a), the bias flux $B_{BIAS}$ and the magnetic flux $B_{21}$ overlap constructively (coil current positive, flux $B_{21}$ in the z-direction), whereas in the situation shown in FIG. 4, diagram (b), the bias flux $B_{BIAS}$ and the magnetic flux $B_{21}$ overlap destructively (coil current negative, flux $B_{21}$ against the −z direction).

When fully compensated ($B_{BIAS}+B_{21}=0$), the axial (net) force is zero and the rotor is in its nominal axial position. However, to reduce energy consumption, it may be useful to compensate the axial bias force by another bearing (not shown). This further bearing can be, for example, a passive magnetic bearing. However, it is also possible to use a second combination bearing or another bearing that produces an axial bias force of approximately the same magnitude but acting on the rotor in the opposite direction (i.e., in the z-direction). In this case, a relatively small current through the axial actuator coil 21 is sufficient to hold the rotor in its force-free (nominal) position.

As mentioned, the axial position of the rotor is thereby continuously detected by the sensor device 30. The control electronics is designed to adjust the current through the axial actuator coil 21 in such a way that the rotor is always returned to or held in its force-free position (position feedback control). In this situation, the current thus fluctuates about zero Ampere during operation of the device (the magnetic bearing). If the axial bias force is not compensated or not fully compensated by another bearing as mentioned above, then the current of the axial actuator coil 21 in operation fluctuates around a certain nominal current.

To reduce eddy current losses, in some exemplary embodiments the soft magnetic elements conducting the magnetic flux (radial and axial yoke 11, 12) may also be made of a laminated stack of sheets or, for example, of a soft magnetic composite material (soft magnetic composite).

For the generation of radial bearing forces, at least two, but in particular three or four further actuator coils 22 are provided on the radial yoke 12, which are referred to here as radial actuator coils. In the example shown in FIGS. 1 and 2 four actuator coils 22*a-d* are magnetically coupled to the radial yoke 12. With a suitable current applied to the radial actuator coils 22*a-d*, a force can be generated in any radial direction (in the xy plane, see also sectional view in FIG. 5). The rotor magnet 20 generates in the radial air gap $\delta_{R1}$, as mentioned, the bias flux $B_{BIAS}$, which is superimposed (constructively or destructively, depending on the direction of the current) by the magnet flux $B_{22}$, which is generated by the coils 22*a-d*.

Figure 4:
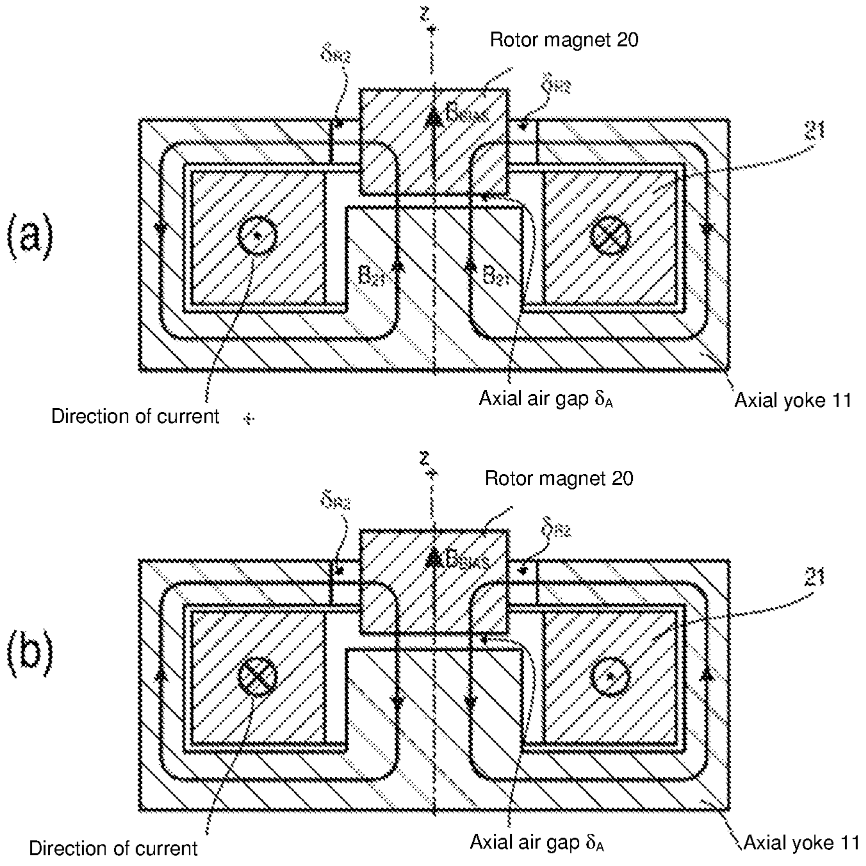
FIG. 4 illustrates the force effect of the coil current in the axial actuator coil.
Figure 5:
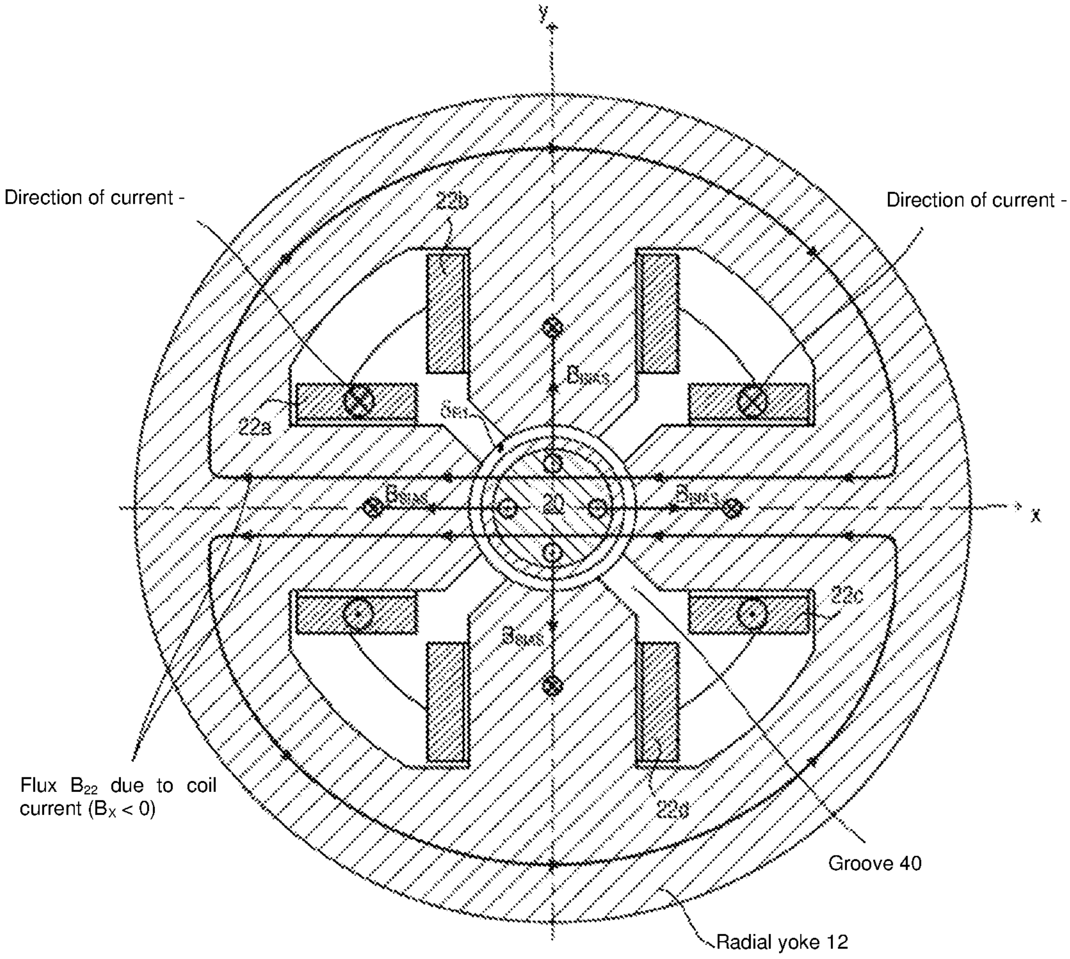
FIG. 5 illustrates the force effect of the coil current in the radial actuator coils.

The example of FIG. 3 shows the same cross-section as FIG. 2, wherein in FIG. 3 the magnetically relevant air gaps $\delta_{R1}$, $\delta_{R2}$, $\delta_A$ and $\delta_X$, as well as the magnetic field lines $B_{BIAS}$ of the bias flux generated by the rotor magnet 20 and the magnetic flux generated by the coil 21, are shown. The course of the flux in the radial yoke 12, in particular the magnetic flux of the actuator coils 22*a-d*, which is not included in FIG. 3, is shown schematically in FIG. 5. The bias flux generated by the rotor magnet 20 is shown in FIGS. 3-5 and denoted by $B_{BIAS}$. The corresponding magnetic field lines run from the permanent magnet 20, through the radial air gap $\delta_{R1}$, the radial yoke 12, the air gap $\delta_X$ (possibly leakage flux), the axial yoke 11 and the axial air gap SA back to the permanent magnet 20. In FIG. 5 (as usual) the symbol Θ is used for field lines coming out of the drawing plane and the symbol ⊗ for field lines running into the drawing plane. The same applies to the direction of current through the coils (see FIG. 4, for example).

The magnetic flux generated by the axial actuator coil 21 is denoted by $B_{21}$ in FIG. 4. The corresponding magnetic field lines run through the coil (along the z-direction), across the air gaps $\delta_A$ and $\delta_{R2}$ and the yoke 12. The magnetic flux $B_{22}$ generated by the radial actuator coils 22*a-d* is shown as mentioned in FIG. 5. However, this flux passes essentially through the radial yoke 12 and the air gap $\delta_{R1}$, where the magnetic fluxes $B_{BIAS}$ and $B_{22}$ overlap (sum flux $B_{22}+B_{BIAS}$). Similarly, the magnetic fluxes $B_{BIAS}$ and $B_{21}$ overlap within the air gap SA (sum flux $B_{21}+B_{BIAS}$). It can be seen in FIG. 3 that the rotor magnet 20 generates a bias flux $B_{BIAS}$ in both the radial air gap $\delta_{R1}$ and the axial air gap SA.

In the case shown in FIGS. 3 and 4 (diagram a), the axial actuator coil 21 amplifies the flux $B_{BIAS}$ of the rotor magnet 20, increasing the downward (against the z-direction) pulling force on the rotor. By changing the current direction in coil 21, the flux $B_{21}$ generated by coil 21 counteracts the flux $B_{BIAS}$ of rotor magnet 20, reducing the downward pulling force (see FIG. 4, diagram (b) with respective opposite current direction). With the device shown, it is even possible—with the appropriate design—to generate a force that moves the rotor upwards (i.e. in the z-direction). The terms "up" and "down" refer only to the illustration, not to the real device.

In the example shown in FIGS. 1 to 3, four radial actuator coils 22*a-d* are provided (generally, two or three coils may be sufficient). In FIG. 5, a force to the left (in the negative −x direction) acts on the rotor by energizing the coils 22*a* and 22*c*. It can be seen that in the left region of the (annular) air gap $\delta_{R1}$ the resulting magnetic flux increases compared to the bias voltage and in the right region of the air gap $\delta_{R1}$ the resulting magnetic flux decreases compared to the bias voltage. If the direction of current in the coils 22*a* and 22*c* is reversed, a force in the positive x direction is generated accordingly. The other two radial actuator coils 22*b* and 22*d* remain current-free in this (theoretical) case, since they are only needed to generate forces in the y-direction.

If the rotor is at its desired position, i.e. in the illustration from FIG. 2 at x=0 and y=0, then the radial forces cancel each other out due to the magnetic bias. This means that the radial actuator coils 22*a-d* can be operated with an average current of zero Amperes, so that the energy consumption is relatively small.

The illustrated magnetically conductive element (radial yoke 12) is wound by four coils 22*a-d* in the examples described herein. The grooves shown (see, e.g., FIG. 5, groove 40) may result in an alternating flux component in the rotor sleeve. In order to reduce the eddy current losses in an electrically conductive rotor sleeve, these grooves can also be connected via thin webs (saturation webs).

In order to center the rotor radially, not only the axial position (z-coordinate) but also the radial position of the rotor (x- and y-coordinates) is continuously measured by the above-mentioned sensor device 30. The current position of the rotor is determined by the control electronics based on the sensor signals. The control electronics further includes a position control, which compares the measured position (x, y, z) of the rotor with the desired position, e.g. (0, 0, 0), and adjusts the currents through the actuator coils 21 and 22*a-d* in such a way that the resulting magnetic forces in the air gap $\delta_A$ and $\delta_{R1}$ counteract any deviation from the desired position. For this purpose, the control electronics can have a suitable power output stage (e.g. consisting of (MOS) transistors). Suitable control electronics are known per se and are therefore not further explained here.

In the examples described so far, a shaft end of the shaft 10 is inserted into the axial yoke 11, which is designed similarly to a pot magnet. However, this is not necessarily the case. In the example shown in FIG. 6, the shaft 10 extends through the radial yoke 11. In this example, the rotor magnet 20 can be arranged on the outside of the circumference of the shaft 10. The same applies to the (optional) flux guide elements 13 and 19. The course of the magnetic field lines and the magnetic flux (bias flux $B_{BIAS}$, as well as the magnetic fluxes of the coils $B_{21}$ and $B_{22}$) do not differ significantly from the previous example, and reference is made to the above explanations, especially to FIGS. 4 and 5. In this example, the axial air gap $\delta_A$ is not located between the axial yoke 11 and the end face of shaft 10 but between the axial yoke 11 and an end face of a shaft step, a shaft shoulder or a part connected to the shaft 10, such as the flux guide element 19 or the rotor magnet 20.

In the examples described so far, the rotor magnet 20 is magnetized in the axial direction. In particular, in the example of FIG. 6, the rotor magnet 20 could also be formed as a ring magnetized in the radial direction. In this case, the rotor magnet 20 would be arranged at the position of the flux guide element 13, which in this case would no longer be needed. The permanent magnet also does not necessarily have to have a cylindrical shape or a ring shape. It is sufficient if the flux guide elements 13 and 19 are adapted to the shape of the yokes 11 and 12 or the shape of the air gaps. The shaft 10 does not necessarily have to rotate either, it does not even have to be rotatable for the combined bearing to operate (even though a rotor is indicated—as is usual with electric motors). In the example shown in FIG. 6, the positions of yoke 11 and yoke 12 can also be interchanged (axial yoke 11 is not necessarily arranged at the end of the shaft).

Figure 7:
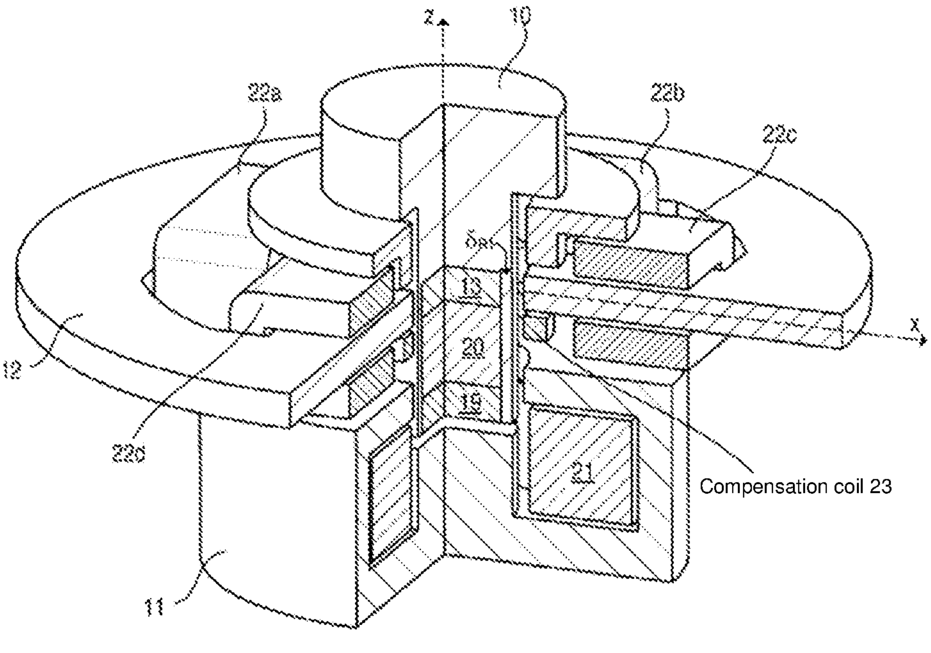
FIG. 7 shows another example with an additional compensation coil.

FIG. 7 illustrates another exemplary embodiment in a perspective sectional view. The example of FIG. 7 is essentially the same as the example of FIGS. 1-3 except for the additional compensation coil 23, which (viewed in the −z direction) is arranged next to the radial yoke 12. In order to minimize the influence of the leakage magnetic flux of the axial actuator coil 21 on the bias flux $B_{BIAS}$ in the radial air gap $\delta_{R1}$, the additional compensation coil 23 can be provided close to the radial yoke 12. The compensation coil 23 may be arranged coaxially with the shaft 10. This coil is energized in such a way that in the air gap $\delta_{R1}$ the magnetic leakage flux of the axial actuator coil 21 is almost cancelled by the magnetic flux of the compensation coil 23. This can be easily achieved by means of a series connection of actuator coil 21 and compensation coil 23. This reduces the coupling of the axial to the radial control loop, which control the axial and radial position of the rotor R and the shaft 10, respectively. For the rest, reference is made to the description of FIGS. 1-3.

Terms such as "first", "second", and the like, are used to describe various elements, regions, sections, etc. and are also not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

It is to be understood that the features of the various embodiments described herein may be combined with each other, unless specifically noted otherwise.

Although various embodiments have been illustrated and described with respect to one or more specific implementations, alterations and/or modifications may be made to the illustrated examples without departing from the spirit and scope of the appended claims. With particular regard to the various functions performed by the above described components or structures (units, assemblies, devices, circuits, systems, etc.), the terms (including a reference to a "means") used to describe such components are intended to correspond—unless otherwise indicated—to any component or structure that performs the specified function of the described component (e.g., that is functionally equivalent), even if it is not structurally equivalent to the disclosed structure that performs the function in the herein illustrated exemplary implementations of the invention.

It will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

The invention claimed is:

1. A device for supporting a shaft; the device comprising:
- a permanent magnet connected to the shaft;
- a stator having a first yoke and a second yoke, both of which are composed of a soft-magnetic material;
- a first actuator coil arranged on the first yoke; and
- two or more second actuator coils arranged on the second yoke,
- wherein the first yoke has an opening into which the shaft is inserted so that an axial air gap is formed between the first yoke and an end face of the shaft, or an element connected thereto,
- wherein the first yoke is shaped such that a radial air gap is formed between the first yoke and a circumferential surface of the shaft,
- wherein the second yoke is arranged such that a further radial air gap is formed between the circumferential surface of the shaft and the second yoke,
- wherein the permanent magnet is positioned relative to the first yoke and the second yoke such that the permanent magnet generates a magnetic bias flux in both the axial air gap and the further radial air gap.

2. The device of claim 1, wherein the first yoke and the second yoke are spaced apart in an axial direction by a distance.

3. The device of claim 1, wherein the first yoke and the second yoke are connected to each other.

4. The device of claim 3, wherein the first yoke and the second yoke are connected to each other via webs.

5. The device of claim 1, wherein one end of the shaft is inserted into the first yoke and the axial air gap is formed between an end face at the end of the shaft or of an element connected to the shaft and the first yoke.

6. The device of claim 5, wherein the element connected to the shaft is a permanent magnet.

7. The device of claim 5, wherein the element connected to the shaft is a flux guide element.

8. The device of claim 1, wherein the shaft extends through the first yoke and the axial air gap is formed between an end face of a shaft shoulder, or an element connected to the shaft, and the first yoke.

9. The device of claim 8, wherein the element connected to the shaft is a permanent magnet.

10. The device of claim 1, wherein the element connected to the shaft is a flux guide element.

11. The device of claim 1, wherein the permanent magnet is arranged in a central opening of the shaft and is magnetized in the axial direction.

12. The device of claim 1, wherein the permanent magnet extends around a circumference of the shaft.

13. The device of claim 1, wherein the permanent magnet extends in the axial direction between the first yoke and the second yoke.

14. The device of claim 1, wherein the first actuator coil is configured to generate, upon energization of the first actuator coil, a magnetic flux in the axial air gap and which is superimposed on the magnetic bias flux in the axial air gap.

15. The device of claim 1, wherein the two or more second actuator coils are configured to generate, upon energization of the two or more second actuator coils, a magnetic flux in the further radial air gap and which is superimposed on the magnetic bias flux in the further radial air gap.

16. The device of claim 1, further comprising one or more compensation coils arranged close to the second yoke and configured to reduce the magnetic leakage flux of the first actuator coil in the radial air gap when energized.

* * * * *